(12) United States Patent
Nielsen et al.

(10) Patent No.: US 7,844,597 B2
(45) Date of Patent: Nov. 30, 2010

(54) MODIFYING A DATABASE COMPRISING IMAGE FIELDS

(75) Inventors: Peter Dam Nielsen, Kgs. Lyngby (DK); Christian Kraft, Hvidovre (DK)

(73) Assignee: Nokia Corporation, Espoo (FI)

( * ) Notice: Subject to any disclaimer, the term of this patent is extended or adjusted under 35 U.S.C. 154(b) by 504 days.

(21) Appl. No.: 10/663,477

(22) Filed: Sep. 15, 2003

(65) Prior Publication Data
US 2005/0060276 A1    Mar. 17, 2005

(51) Int. Cl.
*G06F 17/30* (2006.01)
(52) U.S. Cl. ...................................................... 707/712
(58) Field of Classification Search ................. 365/299; 379/355.09; 455/566; 707/1, 712
See application file for complete search history.

(56) References Cited

U.S. PATENT DOCUMENTS

| | | | |
|---|---|---|---|
| 5,073,927 A * | 12/1991 | Grube | 348/14.01 |
| 5,414,444 A * | 5/1995 | Britz | 345/156 |
| D405,457 S * | 2/1999 | Kawashima | D16/208 |
| 5,889,852 A * | 3/1999 | Rosecrans et al. | 379/355.05 |
| 6,084,951 A * | 7/2000 | Smith et al. | 379/93.17 |
| 6,427,078 B1 * | 7/2002 | Wilska et al. | 455/550.1 |
| 6,434,403 B1 * | 8/2002 | Ausems et al. | 455/556.2 |
| 6,510,325 B1 * | 1/2003 | Mack et al. | 455/575.2 |
| 6,512,819 B1 * | 1/2003 | Sato et al. | 379/93.23 |
| 6,657,660 B2 * | 12/2003 | Shiota et al. | 348/231.99 |
| 6,681,120 B1 * | 1/2004 | Kim | 455/556.1 |
| 6,766,018 B1 * | 7/2004 | Morita | 379/355.09 |
| 6,832,102 B2 * | 12/2004 | l'Anson | 455/556.1 |
| 6,973,299 B2 * | 12/2005 | Apfel | 455/412.2 |
| 7,003,318 B2 * | 2/2006 | Kota et al. | 455/556.1 |
| 7,027,084 B1 * | 4/2006 | Watanabe | 348/211.2 |
| 7,111,317 B1 * | 9/2006 | McIntyre et al. | 725/105 |
| 7,120,461 B2 * | 10/2006 | Cho | 455/556.1 |
| 7,206,806 B2 * | 4/2007 | Pineau | 709/203 |
| 2001/0050875 A1 * | 12/2001 | Kahn et al. | 365/229 |
| 2003/0158837 A1 * | 8/2003 | Suzuki et al. | 707/1 |

(Continued)

FOREIGN PATENT DOCUMENTS

EP    1067748 A2 *    1/2001

OTHER PUBLICATIONS

LG VX6000 Cellular Phone Owner's Manual.*

(Continued)

*Primary Examiner*—Neveen Abel Jalil
*Assistant Examiner*—Mark Andrew X Radtke
(74) *Attorney, Agent, or Firm*—Harrington & Smith

(57) ABSTRACT

An electronic device provide a database application that enables a user to access personal data organized as a plurality of entries in a database, where each of the plurality of entries is associated with a different person and has one or more alphanumeric text fields and an image field. According to one embodiment, a camera control application is arranged to enable the user to control the device using a user input device to capture an image via a digital camera and to present a user selectable option, after capturing an image, for using the captured image as an image field of an entry of the database. According to another embodiment, a messaging application is arranged to display a received message including an image and to present a user selectable option for using the image as an image field of an entry of the database.

16 Claims, 2 Drawing Sheets

U.S. PATENT DOCUMENTS

2004/0198435 A1* 10/2004 Gauld et al. ............. 455/556.1

OTHER PUBLICATIONS

"A Summary of Principles for User-Interface Design." by Talin. Last modified Aug. 14, 1998. Available online at http://www.sylvantech.com/~talin/projects/ui_design.html.*

"Nokia 7650 User's Guide, Issue 4EN", Released Jun. 7, 1998, pp. 19, 42-49.*

"LG VX6000 series—Cell Phones—CNET Reviews" by CNET. Available online at http://reviews.cnet.com/cell-phones/lg-vx6000-verizon-wireless/4652-6454_7-30468833.html.*

Nokia 7650 User's Guide, Issue 4 EN, Released Jun. 7, 1998.

* cited by examiner

MODIFYING A DATABASE COMPRISING IMAGE FIELDS

TECHNICAL FIELD

A device for and a method of modifying a database that organises personal data as a plurality of entries where each of the plurality of entries is associated with a different person and has one or more alphanumeric text fields and one or more image fields.

BACKGROUND OF THE INVENTION

Digital cameras are now commonly used with mobile cellular telephones, personal digital assistants and personal computers. The digital camera may be connected to or integrated with such devices.

Typically when a picture is taken and an image captured by the camera, the image is by default automatically stored in a picture folder with other stored images. A viewer application can be used to view the images e.g. as a photo album.

These devices also typically have database applications that allow the organisation of personal data such as contact details. It would be desirable to take advantage of the presence of a digital camera to improve the usability of such database applications. The database application could include a plurality of entries, where each entry has not only one or more alphanumeric text fields but also one or more image fields. The database application may, as an example, be 'Contacts' with a database entry having alphanumeric text fields for the Name, Address, telephone number, email address etc of a person and an image field, for displaying a picture of that person.

It would be desirable enable a user to easily use a captured image as an image field of an entry of the database.

BRIEF SUMMARY OF THE INVENTION

According to one embodiment of the invention there is provided an electronic device comprising: a digital camera; a user input device; memory means storing computer program instructions; and a processor operable under the control of the computer program instructions to provide separately a database application and a camera control application, wherein the database application is arranged to enable a user to access personal data organised as a plurality of entries in a database, where each of the plurality of entries is associated with a different person and has one or more alphanumeric text fields and an image field and wherein the camera control application is arranged to enable the user to control the device using the user input device to capture an image via the digital camera and to present a user selectable option, on capturing an image, for using the captured image as an image field of an entry of the database.

According to another embodiment of the invention there is provided a method of modifying a database that organises personal data as a plurality of entries where each of the plurality of entries is associated with a different person and has one or more alphanumeric text fields and an image field, comprising: providing a first application that captures an image and enables a user to assign the captured image to an image field of a first database entry; and providing a second application for accessing the first database entry to display the image.

According to another embodiment of the invention there is provided an electronic device comprising: message reception means; a user input device; memory means storing computer program instructions; and a processor operable under the control of the computer program instructions to provide separately a database application and a messaging application, wherein the database application is arranged to enable a user to access personal data organised as a plurality of entries in a database, where each of the plurality of entries is associated with a different person and has one or more alphanumeric text fields and an image field and wherein the messaging application is arranged to display a received message including an image and to present a user selectable option for using the image as an image field of an entry of the database.

According to another embodiment of the invention there is provided a method of modifying a database that organises personal data as a plurality of entries where each of the plurality of entries is associated with a different person and has one or more alphanumeric text fields and an image field, comprising: providing a first application that receives an image in an incoming message and enables a user to assign the received image to an image field of a first database entry; and providing a second application for accessing the first database entry to display the image.

BRIEF DESCRIPTION OF DRAWINGS

For a better understanding of the present invention and to understand how the same may be brought into effect, reference will now be made by way of example only to the accompanying drawings in which.

DETAILED DESCRIPTION OF EMBODIMENT(S) OF THE INVENTION

Figure 1:
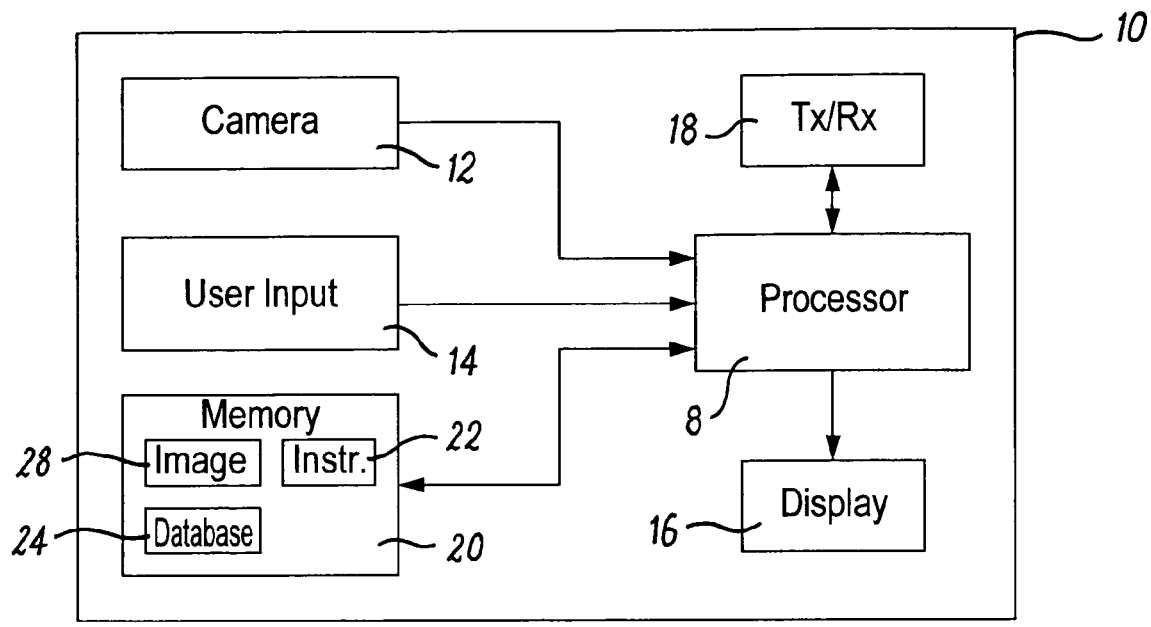
FIG. 1 illustrates an electronic device.

FIG. 1 illustrates an electronic device 10, in this example a mobile cellular telephone. In other examples the electronic device 10 could be, for example, a personal computer or personal digital assistant.

The mobile cellular telephone 10 comprises: a processor 8; a digital camera 12 connected to the processor; a user input device 14 connected to the processor 8; a display 16 connected to the processor 8; a cellular radio transceiver 18 connected to the processor 8; and a memory 20 connected to the processor 8. In this example, a single processor 8 is used and it is directly connected to the other components. However, in other implementations multiple processors and bus systems may be used. In addition, the digital camera 12 may have direct memory access to the memory 20.

The digital camera 12 is, in this example, a typical micro digital camera. It may be integrated into the mobile telephone 10 or may be separate, for example, it may be a modular attachment.

Figure 3A:
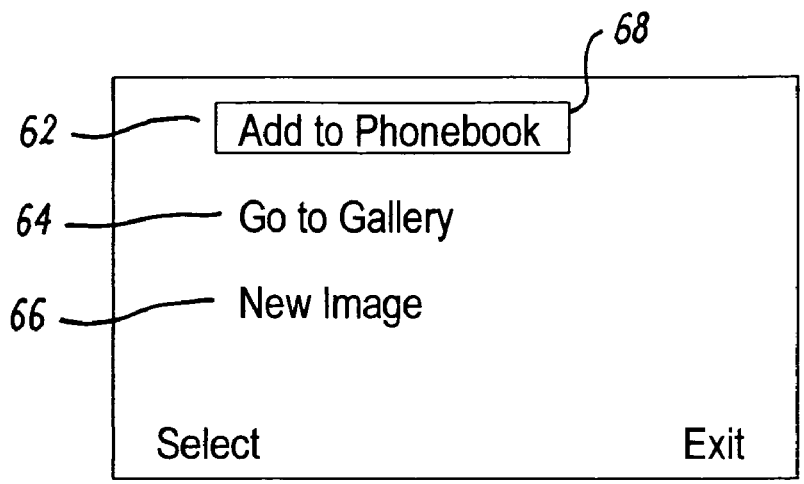
FIGS. 3A and 3B illustrate the user interface of a camera control application.
Figure 3B:
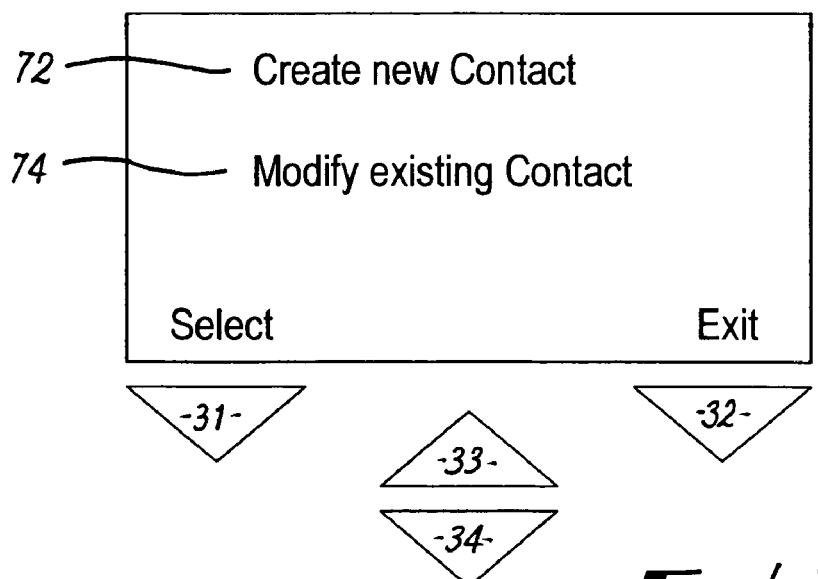

The user input device 14 comprises the keypad of a mobile telephone. The key pad typically comprises a three column by four row array of alphanumeric input keys and a plurality of function keys. In this example, the function keys include a first soft-key 31, a second soft-key 32, an up-scroll key 33 and a down-scroll key as illustrated in FIGS. 3A, 3B and 3C. In other implementations, other function keys may be used. In particular a single soft key may be used. The functions of a soft key changes as the resident application used on the mobile telephone changes. The function of the first soft-key 31 is illustrated by adjacent text on a portion 41 of the display 16 adjacent the first soft-key 31. The function of the second soft-key 32 is illustrated by adjacent text on a portion 42 of the display 16 adjacent the second soft-key 32. Pressing a soft-key activates its associated function.

The memory 20 includes multiple logically distinct memories, including an instructions memory 22 for storing computer program instructions, a database memory 24 for storing a database, and an image memory 28 for storing a folder/album of images. Although in this example, the memory 20 is illustrated as a monolith, in other implementations it may instead be a number of physically separate memories.

The processor 8 is operable under the control of the computer program instructions stored in the instructions memory 22 to control the operation of the telephone 10. The instructions control the manner in which the telephone is controlled via the user input device 14, what is displayed on display 16 and application menu structure used by the telephone 10.

The processor 8 provides at least three separate applications: a camera control application; an image viewing application and a database application. Each application has a specific user interface for a specific purpose. The user input device 14 allows the user to select which of these applications to use.

The image viewing application (Gallery) is capable of accessing the images stored in the image memory 28 and displaying them on the display 16 as a folder/album of images.

The database application organises personal data as a plurality of entries in a database, where each of the plurality of entries is associated with a different person and has one or more alphanumeric text fields and one or more image fields. The user can use the database application to access a person's personal data. In the example illustrated in FIG. 2, the database application is used for 'Contacts'.

Figure 2:
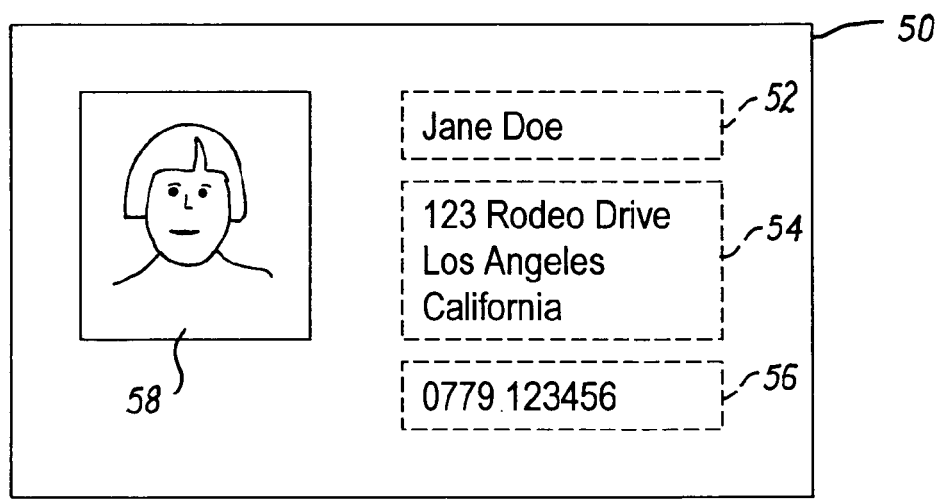
FIG. 2 illustrates a particular example of a database entry 50.

FIG. 2 illustrates a particular example of a database entry 50. This entry 50 comprises a first alphanumeric text field 52 for a contact's name, a second alphanumeric text field 54 for the contact's address, a third alphanumeric text field 56 for the contact's telephone number and an image field 58 for an image of the contact. Other entries of the database may comprise the same or different alphanumeric text fields.

The database application may be used as a 'visual' phone book. For example, the database application user interface may allow a user to scroll through the image fields of the database using the scroll keys 33, 34. Selection of a displayed image using the first soft-key 31 would display the text fields of the selected database entry. Subsequent selection of the first soft-key would initiate a telephone call to the telephone number in the displayed third alphanumeric text field 56.

The camera control application provides a user interface that enables the user to capture an image via the digital camera 12. When the camera control application is started and the first soft-key 31 is pressed, the following user-selectable options are presented: 'Capture', 'Go to Gallery'; 'Self-timer', 'Settings', 'Help', 'Exit'.

After selecting 'Capture' and capturing an image, the image is by default automatically stored in the image memory 28 for access using the image viewing application (Gallery). The camera control application immediately presents the following user-selectable options on capturing an image: 'new image', 'add to phonebook', 'delete', 'send', 'rename image', 'go to gallery', 'settings', 'help' and 'exit'.

In FIG. 3A, three of the alternative options are displayed. A particular option can be selected using the function keys 31-34. The scroll keys 33, 34 are used to scroll the list of options and move the highlight 68 and the first soft-key is used to select the highlighted option.

Selection of the first option 62 "Add to Phonebook" causes the camera control application to copy the captured image or a low resolution version of the image to the database memory 24 from where it is accessible, via the database application, as an image field of a database.

The camera control application therefore immediately presents a plurality of user selectable options, on capturing an image, including an option for using the captured image as an image field of an entry of the database (the 'add to phonebook' option). The presentation is immediate in the sense that it is automatic (it does not require further user action) and fast (without a significant delay).

Selection of the second option 64 "Go to Gallery" causes the camera control application to be held, if multitasking is supported, or terminated, if multitasking is not supported, and the image viewing application (Gallery) to start. The captured images, stored in the image memory 28, are accessible using the image viewing application (Gallery).

Selection of the third option 66 "New image" causes the camera control application to change its user interface to that suitable for capturing another image.

When the first option 62 is selected the camera control application presents multiple alternative user selectable sub-options as illustrated in FIG. 3B. A particular sub-option can be selected using the function keys 31-34. The scroll keys 33, 34 are used to move the highlight 68 and the first soft-key is used to select the highlighted sub-sub-option.

Selection of the first sub-sub-option 72 "Create new Contact" causes the camera control application to create a new entry in the database that has the captured image as its image field. The user may complete the alphanumeric text fields using the user input 14.

Selection of the second sub-sub-option 74 "Modify existing Contact" causes the camera control application to present a scrollable menu of the existing database entries. The selection of one of the entries adds the captured image to the image field of the selected entry.

In this example, the processor 8 is responsive to an incoming call received via the radio cellular transceiver 18 to display an image of the person originating the call. The processor 18 identifies the database entry that has a third alphanumeric text field 56 that corresponds to the telephone number of the call originator. The processor 8 then displays in the display 16 the image from the image field 58 of that identified database entry 50.

In the embodiment described, a captured image is automatically stored to the image memory 28. In an alternative embodiment, the memory 20 includes a temporary memory and a captured image is automatically stored to the temporary memory instead of in the image memory 28. The temporary memory acts like a buffer. It stores the most recently captured image but is over written when the next image is captured. After selecting 'Capture' and capturing an image, the camera control application presents, instead of a 'delete' option, a user-selectable option: 'add to Gallery'. The 'delete' option is no longer required as the image is not automatically saved to the image memory 28. Selection of the 'Add to Phonebook' option transfers the image from the temporary memory to the database memory 24 from where it is accessible, via the database application, as an image field of a database. Selection of the 'Add to Gallery' option transfers the image from the temporary memory to the image memory 28 from where it is accessible using the image viewing application (Gallery).

In the above described embodiment a database used in a database application, is modified from within a camera control application. The camera control application enables an image that has been captured using this application to be entered into the database without having to laboriously exit the camera control application, enter the database application and then modify the database.

In another embodiment the database is modified from within a messaging application. The messaging application enables a message including an image that has been received via the radio cellular transceiver 18 to be viewed. The messaging application also allows an image that has been received in a message to be entered into the database from within the messaging application. This may be provided in a manner similar to that described for the image capturing application. This avoids the need to laboriously exit the messaging application, enter the database application and then modify the database. The messaging application may allow a user to view messages such as email or multimedia messages (MMS) or instant messages (IM) received via the radio cellular transceiver 18.

Although embodiments of the present invention have been described in the preceding paragraphs with reference to various examples, it should be appreciated that modifications to the examples given can be made without departing from the spirit and scope of the invention.

We claim:

1. A computer readable medium encoded with a computer program comprising:
   program instructions for controlling an electronic device, the electronic device having a digital camera and a user input device, which program instructions when loaded into a processor, provide:
   a database software application;
   a camera control software application that is separate from the database software application; and
   an image viewing software application that is separate from the camera control software application and the database software application,
   wherein the database software application provides a user interface that enables a user to access personal data organized as a plurality of contacts entries in a database, where each contacts entry is associated with a different person and has one or more alphanumeric text fields and an image field and wherein the camera control software application provides for taking a picture and then assigning the picture from a camera menu instead of from a phonebook menu, the camera control software application providing a user interface that enables the user to control the electronic device using the user input device for displaying the camera menu to capture an image via the digital camera and immediately and automatically presenting a user selectable option through the camera menu, on capturing an image, for entering the database software application while remaining in the camera menu and using the captured image as an image field of a contacts entry of the database, and presenting a user selectable option to access the captured image through the image viewing software application, wherein functionality of the camera menu is provided by the camera control software application and wherein functionality of the phonebook menu is provided by the database software application.

2. A method comprising:
   for controlling an electronic device, the electronic device having a digital camera and a user input device, the method performing operations of:
   capturing an image via a digital camera by a selection of an option presented via a camera menu displayed on a user interface provided by a camera control software application;
   immediately and automatically upon capturing the image, providing, through the camera control software application, a user-selectable option through the user interface for entering the captured image as an image field for a contacts entry maintained by a database software application and providing a user-selectable option through the user interface to cause a image viewing software application to access the captured image, wherein the camera control software application provides for taking a picture and then assigning the picture from the camera menu instead of from a phonebook menu; and
   upon selecting a user-selectable option via the camera menu for entering the captured image as an image field for the contacts entry, while remaining in the camera menu, causing the database software application to save the captured image in a database as an image field for the contacts entry, wherein functionality of the camera menu is provided by the camera control software application and wherein functionality of the phonebook menu is provided by the database software application.

3. The method as in claim 2, wherein the database is modified from within the camera control software application.

4. An apparatus comprising:
   a camera control software application;
   a database software application;
   an image viewing software application;
   a digital camera;
   an input including soft keys;
   a memory configured to store the database, camera control software application, the database software application, and the image viewing software application;
   a display configured to provide a user interface; and
   a processor configured to control the digital camera and the display, configured to access the memory, configured to receive information through the input, and configured to execute the camera, database, and image viewing software applications retrieved from the memory,
   wherein the camera control software application is configured to enable a user to capture an image via the digital camera through an option displayed via a camera menu on the user interface and, immediately and automatically after capturing the image, to present via the camera menu on the user interface a plurality of user selectable options including an option to add the captured image to a database that is accessible by the database software application, while remaining within the camera control software application, and including an option to invoke the image viewing software application to access the captured image, wherein the user selectable options are selectable by the user through corresponding ones of the soft keys, wherein the camera control software application provides for taking a picture and then assigning the picture from the camera menu instead of from a phonebook menu, wherein functionality of the camera menu is provided by the camera control software application and wherein functionality of the phonebook menu is provided by the database software application.

5. The apparatus as in claim 4, wherein, upon the user selecting the option to add the captured image to the database memory, the camera control software application is configured to present a plurality of sub-options including a sub-option to create a new contacts entry in the database and a sub-option to modify an existing contacts entry in the database.

6. The apparatus as in claim 5, wherein upon the selection of one of the sub-option to create a new contacts entry and the sub-option to modify an existing contacts entry, adding the captured image to an image field of the selected one of the new contacts entry and the existing contacts entry.

7. The apparatus as in claim 6, wherein the database is modified from within the camera control software application.

8. The apparatus as in claim 4, wherein the database software application functions as at least a telephone book.

9. The apparatus as in claim 4, wherein each contacts entry has at least one alphanumeric text field for storing a telephone number.

10. The apparatus as in claim 9, operating as a telephone, wherein the processor is responsive to an incoming call to display an image from the image field of a contacts entry that has an alphanumeric text field corresponding to the telephone number originating the incoming call.

11. The apparatus as in claim 4, wherein the contacts entry can be selected by a user by scrolling the image fields of the database.

12. The apparatus as in claim 4, further comprising a temporary memory for temporarily storing a captured image.

13. The apparatus as in claim 12, wherein the camera control software application is arranged to transfer the captured image from temporary storage in the temporary memory to permanent storage accessible by the viewing application.

14. A user interface, comprising:
a display; and
an input comprising a plurality of soft keys, and configured to enable a user to, in cooperation with a camera control software application, capture an image via a digital camera through an option displayed on a camera menu on the user interface and, immediately and automatically after capturing the image, to present a plurality of user selectable options through the camera menu including an option to add the captured image to a database that is accessible by a database software application, while remaining within the camera control software application, and comprising an option to invoke an image viewing software application to access the captured image, wherein the user selectable options are selectable by the user through corresponding ones of the plurality of soft keys, wherein the camera control software application provides for taking a picture and then assigning the picture from the camera menu instead of from a phonebook menu, wherein functionality of the camera menu is provided by the camera control software application and wherein functionality of the phonebook menu is provided by the database software application.

15. The user interface as in claim 14, wherein, upon the user selecting the option to add the captured image to the database memory, displaying a plurality of sub-options including a sub-option to create a new contacts entry in the database and a sub-option to modify an existing contacts entry in the database.

16. The user interface as in claim 15, wherein upon the selection of one of the sub-option to create a new contacts entry and the sub-option to modify an existing contacts entry, adding the captured image to an image field of the selected one of the new contacts entry and the existing contacts entry.

* * * * *